UNITED STATES PATENT OFFICE.

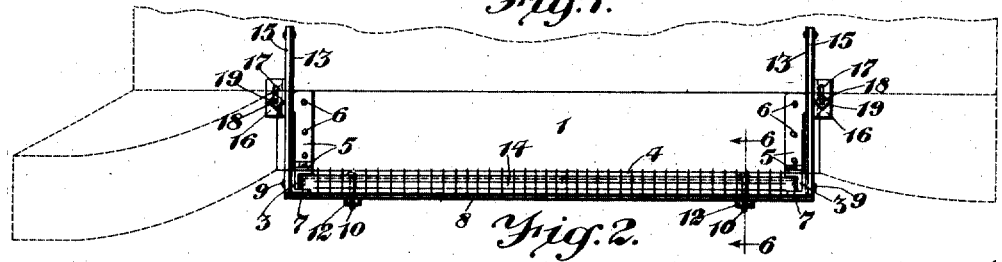

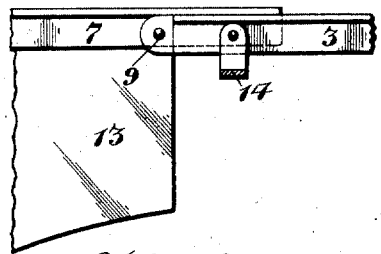
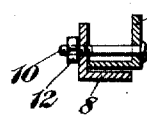
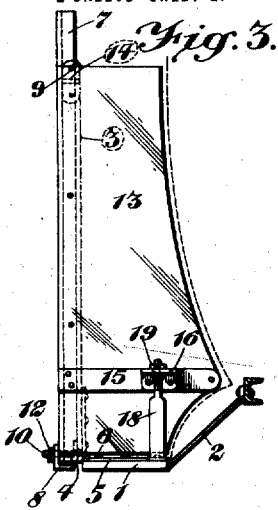
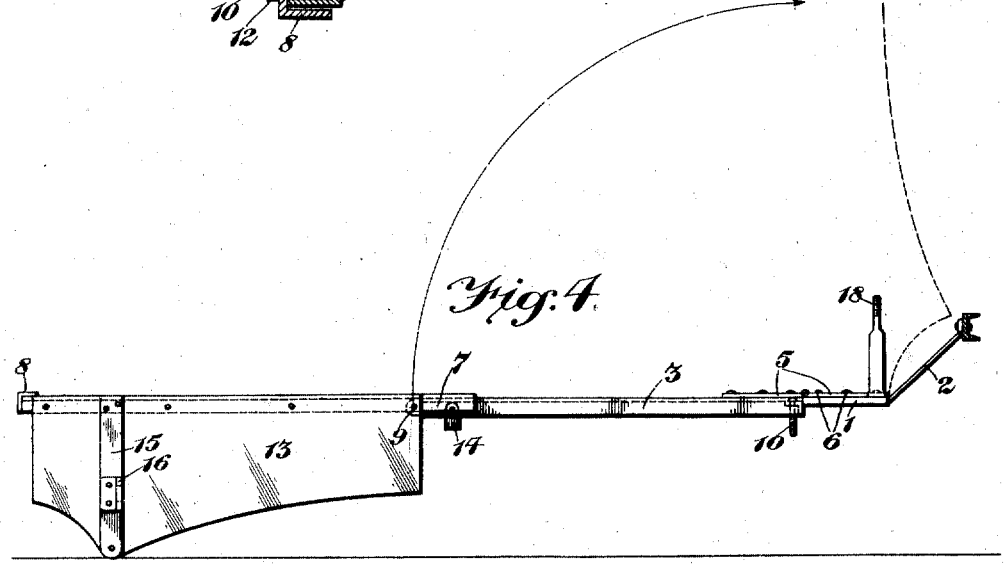

JASPER C. GOIN, OF DAHLGREN, ILLINOIS.

COMBINED BED AND PARCEL-CARRIER.

1,229,255.　　　　　　Specification of Letters Patent.　　Patented June 12, 1917.

Application filed June 12, 1916.　Serial No. 103,290.

*To all whom it may concern:*

Be it known that I, JASPER C. GOIN, a citizen of the United States, residing at Dahlgren, Hamilton county, and State of Illinois, have invented a new and useful Combined Bed and Parcel-Carrier, of which the following is a specification.

This invention relates to a combined bed and parcel carrier.

The invention consists of a frame adapted to be hinged to the running board of an automobile and comprising a number of sections capable of being folded in a vertical position above the running board and spaced from the side of the automobile body to form a compartment for the reception of packages and the like, and also capable of being extended horizontally so that the sections are in continuation of each other and of the running board to form a bed frame, and having bed springs supported by the sections.

The object of the invention is to provide a device of the character mentioned having supporting devices for supporting the folded sections of the frame in vertical adjustment for the purpose stated and arranged to interlock with each other to retain a horizontal position in alinement with the running board of the vehicle so that the frame and springs are in alinement and coöperate with the running board to form the bed.

In the drawing,

Figure 1 is a plan view of the device folded and supported in vertical position above the running board to form a compartment for parcels, packages and the like.

Fig. 2 is a plan view of the device extended horizontally to form a bed, the springs being conventionally indicated.

Fig. 3 is a side elevation of the device folded vertically above the running board and illustrating the parts for supporting folded sections of the frame vertically.

Fig. 4 is a side elevation of the device extended laterally from the running board.

Fig. 5 is a detailed sectional view on the line 5—5 of Fig. 2, enlarged relative to the preceding view showing the interlocking devices between the sections of the frame.

Fig. 6 is a detailed sectional view on the line 6—6 of Fig. 1 showing one of the devices for fastening together the different parts of the frame when the frame is in a vertical position.

The running board 1 is supported horizontally at the side of the automobile body by bracket arms 2 carried by the frame of the automobile. The frame of the bed and parcel carrier includes an inner frame part composed of an angle bar bent to provide two side arms 3 and a connecting portion 4. Hinges 5 connect the inner part of the frame to the running board and the same fastening devices 6 are employed to connect the hinges to the running board and to hold the running board upon the arms 2. The pivots of the hinges are at the outer side edge of the running board, so that the inner part of the frame can be raised to a vertical position above the side edge of the running board and spaced from the automobile body, or can be placed in a horizontal position as desired.

The outer part of the frame also comprises an angle bar folded to provide side portions 7 and a connecting portion 8, the side portions 7 being pivoted to the sides 3 of the inner frame part by axially alined hinge bolts 9. The outer frame part is arranged so that the hinged flanges thereof will bear upon the upper surface of the sides 3, thus forming a locked connection so that when the two parts of the frame are horizontally extended they will be supported approximately in alinement with each other. When the outer end of the inner frame part is raised the inner end of the outer frame part will also be raised, enabling the outer frame part to fall inwardly against the inner frame part. The connecting part 4 of the inner frame supports a number of projecting bolts 10 which, when the two frame parts are folded together and are in vertical positions, extend through holes 11 in the connecting part 8 of the outer frame and receive clamping nuts 12 by which the frame is retained in folded position.

The outer frame part carries wall members 13 which extend toward the body of the automobile when the device is folded, said walls forming two sides of the compartment, the other two sides of which are formed by the vehicle body and the springs of the bed respectively. The outer ends of the side arms 3 of the inner frame support a pivoted truss-bar 14 constituting a support for the intermediate portion of the springs when the device is folded in a vertical position to form the compartment, and which constitutes a brace to strengthen the intermediate portion of the frame when utilized as a bed. When utilized as a bed the bracket 14 turns on its pivots so that it is considerably below the springs and therefore forms no obstruction to the expansion of the springs under the weight of the person occupying the bed.

The walls 13 are strengthened by legs 15 having their upper ends attached to the side arms 7 of the outer frame part and being of sufficient length to support the frame substantially horizontal, and to relieve the weight of the frame from the side walls when the device is used as a bed. Brackets 16 are attached to the legs 15 and are provided with slots 17 to receive the upper extremities of the supporting arms 18 when the frame is folded in vertical position. The upper ends of the arms 18 are threaded and receive clamping nuts 19, which approximately hold the device in folded position vertically above the running board to form the compartment for parcels and packages, and the like.

A device of this character is highly useful in connection with automobiles and constitutes a convenient attachment capable of use as a parcel and package carrier when in transit and conveniently changeable into a bed frame when the automobile is not in motion.

What I claim and desire to secure by Letters Patent, is:—

1. A device of the character described, comprising an inner frame part, hinges connecting the inner frame part with the running board of an automobile and enabling it to be moved to horizontal position or to vertical position at the outer side edge of the running board, an outer frame part pivoted to the inner frame part and arranged to form a continuation thereof when the inner frame part is horizontal and to fold against the outer side of the inner frame part when in vertical position, means for interlocking the inner and outer frame parts in horizontal position, means for supporting said frame parts vertically at the outer side of the running board, and side walls carried by one of said frame parts extending toward and terminating close to the automobile body, said side walls being shaped to form complete end closures for the space between said frame parts and the automobile body when said frame parts are in vertical position.

2. In an automobile, the combination with the running board thereof, of an inner frame part, hinges connecting the inner frame part with the running board and enabling said frame part to be moved to vertical position at the outer edge of the running board, or to horizontal position in alinement with the running board as desired, an outer frame part pivoted to the inner frame part and arranged to fold against the outer side of the inner frame part in vertical position and to be extended into horizontal continuation of the inner frame part, bed springs supported by said frame parts and arranged to fold in conformity therewith when the frame parts are folded as aforesaid, means for holding said frame parts in substantially horizontal alinement, means in connection with the outer frame part and with the running board for supporting said frame parts in folded position vertically at the outer edge of the running board, and side walls carried by one of said frame parts and extending toward the automobile body when said frame parts are in vertical position, said side walls terminating close to the automobile body and being shaped to form complete end closures of the space between said frame parts and the automobile body.

3. The combination with the running board of an automobile, of an inner frame part, hinges connecting the inner frame part and the running board and enabling said frame part to be moved from horizontal position to vertical position, an outer frame part hinged to the inner frame part and arranged to fold against the outer side of the inner frame part when the latter is moved to vertical position, arms in connection with the running board, and brackets on the outer frame part arranged to engage said arms to support said frame parts folded together in vertical position.

4. The combination with the running board of an automobile, of an inner frame part, hinges connecting it with the running board enabling it to be moved to horizontal position or to vertical position at the outer side edge of the running board, an outer frame part pivoted to the inner frame part and arranged to form a continuation thereof when the inner frame part is horizontal and to fold against the outer side of the inner frame part when in vertical position, springs supported by the inner and outer frame parts, a supporting device for the intermediate portion of the springs when said frame parts are folded together in vertical position, side walls carried by the outer frame part and extending toward the body of the automobile when in vertical position, said side walls terminating close to the automobile body and being shaped to form complete end closures of the space between said frame parts and the automobile body, devices for fastening the frame parts together in vertical position, and devices in connection with the running board for holding the frame parts in vertical position.

In witness whereof, I have signed this specification in the presence of two subscribing witnesses.

JASPER C. GOIN.

Witnesses:
W. O. GOIN,
PAUL GOIN.